(12) United States Patent
Rice

(10) Patent No.: US 8,688,095 B2
(45) Date of Patent: Apr. 1, 2014

(54) MULTIPLE USER PROFILES AND PERSONAS ON A DEVICE

(75) Inventor: Christopher T. Rice, Dallas, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 586 days.

(21) Appl. No.: 12/548,382

(22) Filed: Aug. 26, 2009

(65) Prior Publication Data

US 2011/0053574 A1    Mar. 3, 2011

(51) Int. Cl.
H04M 3/00    (2006.01)
H04M 1/00    (2006.01)
H04M 3/42    (2006.01)

(52) U.S. Cl.
USPC .......... 455/418; 455/551; 455/416; 455/417; 713/100

(58) Field of Classification Search
USPC ........................................................ 455/418
See application file for complete search history.

(56) References Cited

U.S. PATENT DOCUMENTS

| | | | |
|---|---|---|---|
| 6,311,063 B1 | 10/2001 | Valliani et al. | |
| 6,745,040 B2 * | 6/2004 | Zimmerman | 455/458 |
| 6,999,763 B2 | 2/2006 | Ramalho et al. | |
| 7,328,015 B2 | 2/2008 | Ramalho et al. | |
| 7,418,376 B1 | 8/2008 | Feldstein et al. | |
| 2002/0198007 A1 | 12/2002 | Zimmerman | |
| 2005/0060532 A1* | 3/2005 | Dorenbosch et al. | 713/100 |
| 2005/0203835 A1* | 9/2005 | Nhaissi et al. | 705/39 |
| 2008/0031436 A1* | 2/2008 | Der et al. | 379/201.02 |

FOREIGN PATENT DOCUMENTS

| | | |
|---|---|---|
| EP | 1 146 764 | 10/2001 |
| EP | 1 865 699 | 12/2007 |
| FR | 2 807 259 | 10/2001 |

OTHER PUBLICATIONS

International Patent Application No. PCT/US2010/046590: International Search Report dated Nov. 30, 2010, 14 pages.

* cited by examiner

Primary Examiner — Vladimir Magloire
Assistant Examiner — Natasha Cosme
(74) Attorney, Agent, or Firm — Baker & Hostetler LLP

(57) ABSTRACT

A mobile device is configurable to accommodate multiple personas and associated profiles. Once the mobile device is triggered to configure itself with a selected persona/profile, no more information is required by a user (the provider of the trigger) of the mobile device. Each persona/profile is autonomous from any other persona/profile with which the mobile device can be configured. A persona is indicative of a personality, role, or identity portrayed by the device, such as a phone number, for example. A profile is indicative of functions associated with a persona. The mobile device is easily reconfigured via simple UI operations.

24 Claims, 13 Drawing Sheets

| Persona → | First Persona (Individual Work Persona) | Second Persona (Individual Personal Persona) | Third Persona (Spouse Persona) |
|---|---|---|---|
| Profile element ↓ | • Unique Phone Number<br>• Caller ID Tailored To First Persona | • Unique Phone Number<br>• Caller ID Tailored To Second Persona | • Unique Phone Number<br>• Caller ID Tailored To Third Persona |
| Address Book | Unique To First Persona | Shared With Third Persona | Shared With Second Persona |
| Video Share | Common To All Personas | Common To All Personas | Common To All Personas |
| Service provider | Unique To First Persona | Unique To Second Persona | Unique To Third Persona |
| Files | Full Access To First Persona, Read Only Access To Second Persona, No Access To Third Persona | Full Access To First, Second, And Third Personas | Full Access To Third Persona, Read Only Access To Second Persona, No Access To First Persona |
| Location Based Service (LBS) | Based On Device Location | Based On Device Location | Blocked |

FIGURE 2

MULTIPLE USER PROFILES AND PERSONAS ON A DEVICE

TECHNICAL FIELD

The technical field relates generally to providing capabilities on a device, such as a processor or communications device. More specifically, the technical field relates to providing multiple personas and profiles having respective capabilities on a device.

BACKGROUND

Communications devices such as cellular telephones, mobile communication devices, personal digital assistants (PDAs), laptops, and the like are becoming more prevalent as users appreciate the smaller form factors, increased functionality, and the mobility of the devices. It is not uncommon for a person to use more than one communications device. For example, a person may have one mobile phone for personal use and another mobile phone for business use. However, carrying around multiple mobile phones can be awkward and cumbersome. Additionally, it is not uncommon for members of a family to each own and use her/his individual mobile phone. This, too, can present a difficult situation when family members are together and not all members have their respective phones in possession.

SUMMARY

A device, such as a mobile device, is configurable to accommodate a plurality of personas and profiles. Personas and profiles can be automatically changed or changed via simple user interface (UI) operations. For example, an individual can have a work persona and a personal persona. The work persona is indicative of a work phone number and work billing account. The work persona has associated therewith a profile indicative of specific work related functions such as work related email and access to a work database, for example. The personal persona is indicative of a personal phone number and personal billing account. The personal persona has associated therewith a profile indicative of specific personal functions such as personal email, instant messaging, for example. A user of the device can switch between the work persona/profile and the personal persona/profile by, for example, pressing a button on the device, selecting a soft key on the device, entering a short code on the device, providing a voice command to the device, or by providing a biometric input (e.g., fingerprint).

In an example embodiment, when a call is received by the device, the device can be configured (configure itself without requesting information about the persona and associated profile from the user of the device, or without any additional input from the user) to a selected persona/profile. Configuration can be triggered via the simple UI operations described above. For example, when a call is received on the device, a user of the device can determine the intended recipient of the call by looking at the caller ID, or the like, on the device. The user can trigger configuration of the device to the persona and associated profile of the intended recipient by entering a short code and/or a personal identification number (PIN), for example, indicative of the intended recipient. The call can then be handled by the device in accordance with the configured persona and profile. In another example embodiment, the configuration can be triggered automatically by the device by determining the intended recipient of the call and configuring the device with the persona/profile of the intended recipient.

As described in more detail below, utilizing a single device configurable to accommodate multiple personas/profiles, calls can be handled in various novel ways. For example, when a call is received, the intended recipient of the call is determined, and 1) the device is configured to the persona/profile of the intended recipient, 2) the call is transferred to a device that is configured with the persona/profile of the intended recipient, or 3) the call is answered by the device and another device configured with the persona/profile of the intended recipient is bridged into the call.

BRIEF DESCRIPTION OF THE DRAWINGS

The following description is better understood when read in conjunction of the appended drawings.

FIG. 2 shows a chart illustrating example relationships between multiple personas and multiple profiles.

DETAILED DESCRIPTION

Figure 1:
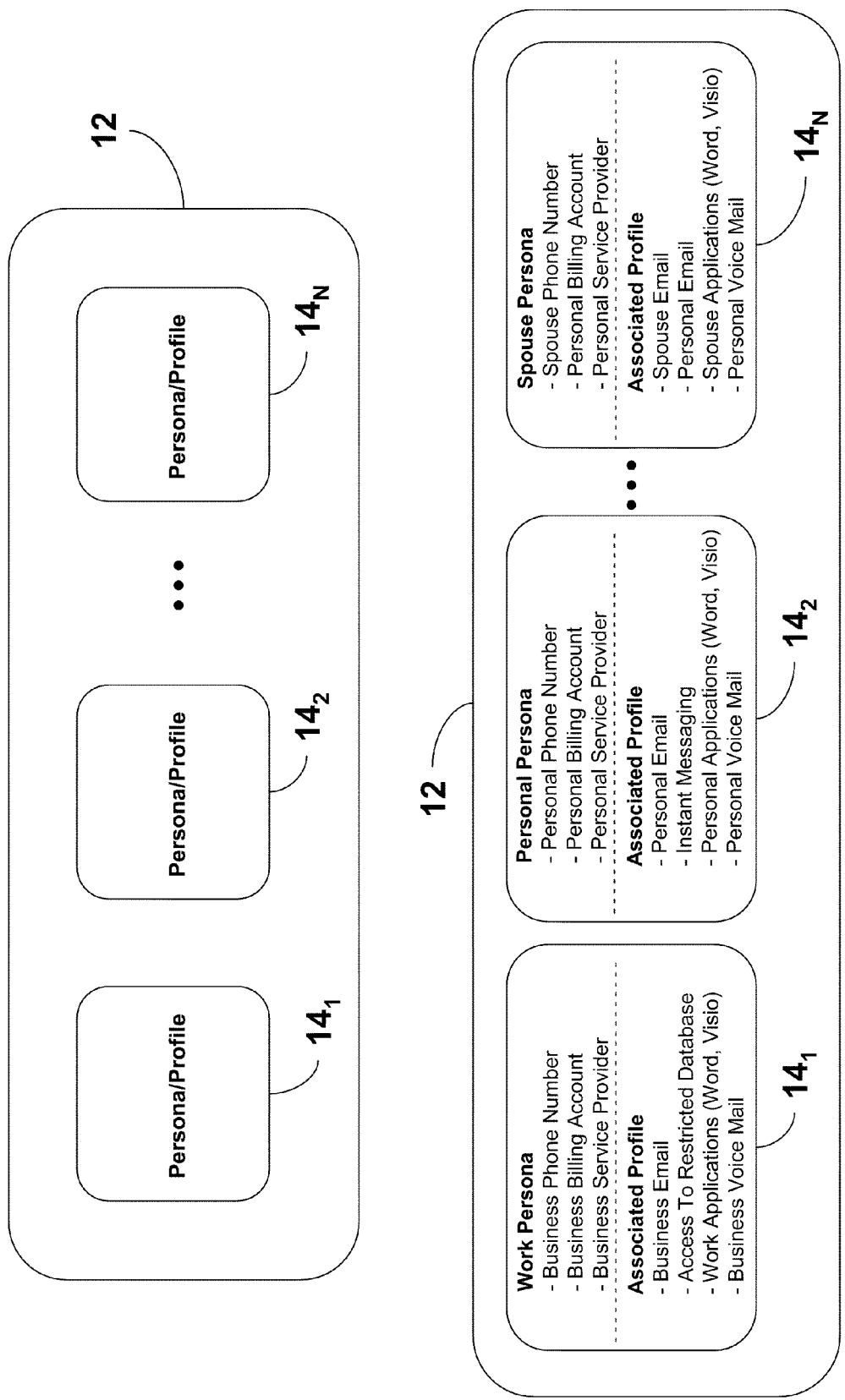
FIG. 1 is a depiction of an example device configured to accommodate a plurality of personas and associated profiles.

FIG. 1 is a depiction of an example device 12 configured to accommodate a plurality of personas and associated profiles $14_1, 14_2,$ through $14_N$. The device 12 can comprise any appropriate device capable of be configured to accommodate a plurality of personas and associated profiles, such as, for example, a cellular telephone, a mobile communication device, a personal digital assistant (PDA), a laptop, or the like It is emphasized the that the depiction provided in FIG. 1 is an example meant to illustrate the concept of a device configured to accommodate multiple personas and associated profiles, and is not intended to imply a specific implementation or architecture.

A persona is a personality, role, or identity portrayed by the device. For example, when making a call from a first device to a second device, the caller ID on the second device will indicate the persona of the first device. Thus, the selected persona is indicative of an identity portrayed by the device. A profile is indicative of functions that can be performed or services that can be provided. Thus, each persona has associated therewith a profile of functions/services. For example, the lower portion of FIG. 1, depicts three example personas: a work persona, a personal persona, and a spouse persona. Thus, a single device 12, such as a mobile phone, can be configured to accommodate each of the work persona, the personal persona, and the spouse persona. When the device 12 is configured with a persona, the device 12 is also configured with the profile of functionality associated with the persona. As shown in FIG. 1, an individual can have a work persona having a business phone number, a business billing account and a business service provider.

When the device 12 is configured with the work persona, the device will receive calls to the business phone number, calls and services performed on the device will be billed to the business billing account, and wireless phone service (for example) is provided by the service provider of the individual's business. When the device 12 is configured with the work persona, the device 12 is also configured with the functionality of the profile associated with the work persona. For example, as depicted in FIG. 1, the functionality associated with the work persona includes business email, access to work related servers and such (e.g., access to a restricted database), the ability to instantiate and execute work related applications such as WORD or VISIO, and business voice mail.

If the individual wants to use the device 12 for personal use, the individual can easily change the persona/profile of the device 12 from the work persona/profile to a personal persona/profile. As described in more detail below, the individual can trigger the change via a user interface (UI) operation, such as, for example, entering a short code indicative of the specific persona to which the device should configure, entering a PIN indicative of the specific persona to which the device should configure, pressing a button indicative of the specific persona to which the device should configure, selecting a soft key indicative of the specific persona to which the device should configure, entering a voice command indicative of the specific persona to which the device should configure, and/or providing a biometric input such as a fingerprint, retina scan, etc.

As depicted in FIG. 1, when the device 12 is configured with the personal persona of the individual, the device will receive calls to the individual's personal phone number, calls and services performed on the device will be billed to the individual's personal billing account, and wireless phone service will be provided by the service provider of the individual. When the device 12 is configured with the personal persona, the device 12 is also configured with the functionality of the profile associated with the personal persona. For example, as depicted in FIG. 1, the functionality associated with the personal persona includes personal email, instant messaging, the ability to instantiate and execute personal applications such as WORD or VISIO, and personal voice mail.

Each persona and associated profile is autonomous with respect to any other persona and associated profile. When the device 12 is configured with a selected persona and associated profile, the device functions independently and separately from previously configured personas and associated profiles. From the perspective of a user of the device, it is as if the device is a dedicated device that was configured with the selected persona and associated profile.

Configuration of the device 12 is not limited to personal and work personas. The device 12 can be configured to any appropriate persona/profile. For example, as depicted in FIG. 1, the individual may want to configure the device 12 for use by his/her spouse. Thus, the individual can trigger the change to the spouse's persona/profile via any of the UI operation described above. When the device 12 is configured with the spouse's persona, the device will receive calls to the spouse's phone number (which may or may not be the same as the individual's phone number), calls and services performed on the device will be billed to the spouse's billing account. The spouse's billing account is depicted in FIG. 1 as being the same as the individual's billing account, however, the billing accounts may differ. When the device 12 is configured with the spouse's persona, the wireless phone service will be provided by the spouse's service provider, which may or may not be the same as the individual's service provider (depicted as the same in FIG. 1). When the device 12 is configured with the spouse's persona, the device 12 is also configured with the functionality of the profile associated with the spouse's persona. For example, as depicted in FIG. 1, the functionality associated with the spouse's persona includes the spouse's email and the individual's email, the ability to instantiate and execute the spouse's applications such as WORD or VISIO, and voice mail that is shared by the individual and the spouse.

In an example embodiment, the device 12 is automatically configured with a persona and associated profile depending upon the geographic location of the device 12. For example, if the user of the device 12 is at work, the device 12 can automatically be configured to a work persona. When the user is home, the device 12 can automatically be configured to a personal persona. The user's profile can be preconfigured to automatically configure the device according to the location of the device. Thus, the device 12 can be automatically configured to a predetermined persona and associated profile in accordance with the location of the device. The location of the device can be determined in any appropriate manner, such as, for example, via the GPS, via A-GPS, via a time distance of arrival calculation, etc., or any combination thereof.

FIG. 2 depicts a chart 16 illustrating example relationships between multiple personas and multiple profiles. The device can be configured to accommodate multiple personas and profiles, wherein profile elements are shared among personas. The chart 16 shows three example personas: First Persona, Second Persona, and Third Persona. Each of the First Persona, Second Persona, and Third Persona, has a unique phone number and tailored identifier (e.g., caller ID). As illustrated in the chart 16, the First Persona is an individual's work persona, the Second Persona is the individual's personal persona, and the Third Persona is the individual's spouse's persona. Various profile elements are available to the personas. For example, the First Persona has access to his own address book. The Second and Third Personas do not have access to the First Persona's address book. However, the Second and Third Personas share an address book. Thus, whether the device is configured with the Second Persona or the Third Persona, each persona has access to the same address book. Each persona can read, write, modify, etc. data of the address book.

Another profile element, Video Share, is common to all three personas. Video Share is a service allowing participates to share images and video. Thus, whether the device is configured with the First Persona, the Second Persona, or the Third Persona, the device has access to the same Video Share service. The chart 16 also shows that each of the First Persona, Second Persona, and Third Persona has its own service provider. Accordingly, when the device is configured with the First Persona, the device will utilize the First Persona's service provider. When the device is configured with the Second Persona, the device will utilize the Second Persona's service provider. When the device is configured with the Third Persona, the device will utilize the Third Persona's service provider. In an example embodiment, all personas are indicative of a common service provider. Thus, the First Persona, the Second Persona, and the Third Persona would have the same service provider.

Further, as depicted in the chart 16, files, such as, text files, images, video, audio files, etc., are accessed differently by the different personas. Thus, different personas can have different access rights. For example, the Second Persona has full access to files that the First Persona and Second Persona had access to. Thus when the device is configured with the Second Persona, the device has full access to files that the First and Third Personas had access to. When the device is configured with the First Persona, the device has full access to the First Persona's files, read-only access to the Second Persona's files, and no access to the Third Persona's files. And, when the device is configured with the Third Persona, the device has full access to the Third Persona's files, read-only access to the Second Persona's files, and no access to the First Persona's files.

The chart 16 also shows the First Persona and the Second Persona have access to location based services (LBSs), and that the Third Persona does not have access to a location based service (LBS). It is to be understood that the combinations of personas and profiles depicted in the chart 16 is exemplary and should not be limited thereto.

Figure 3:
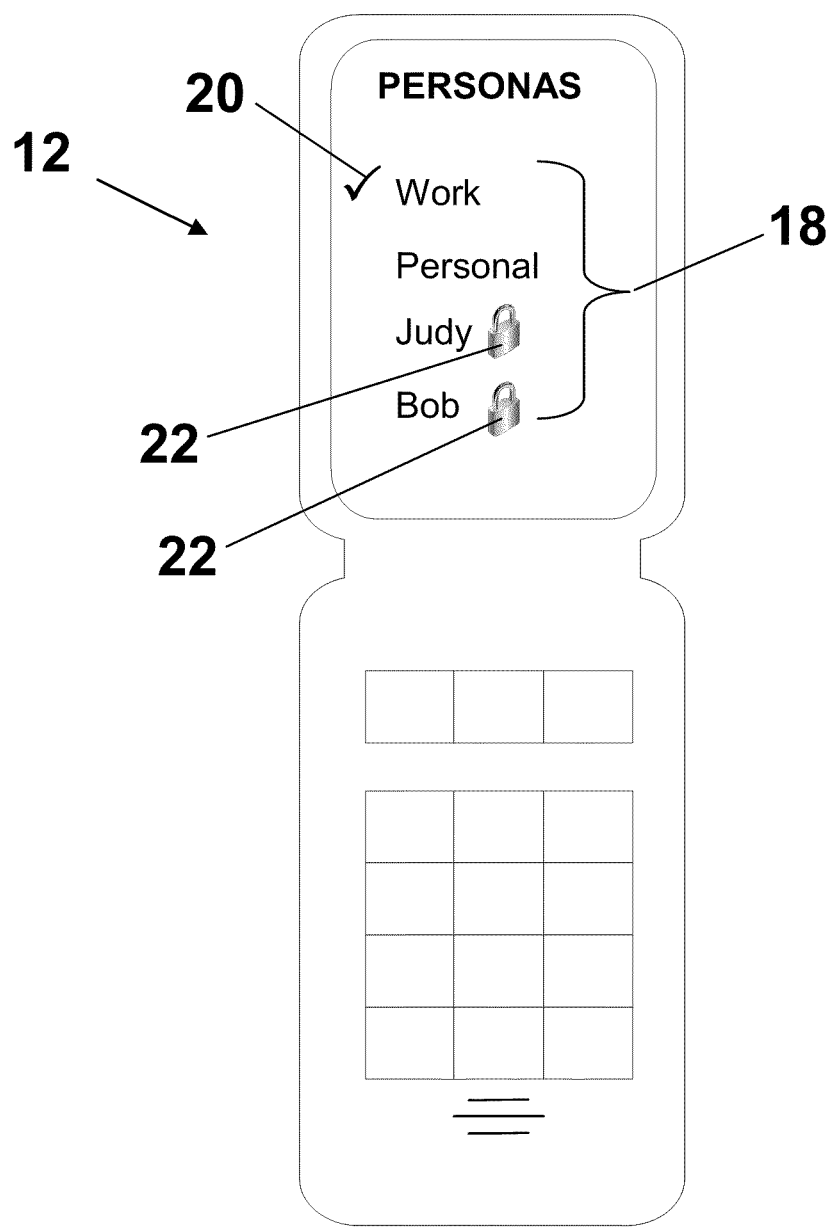
FIG. 3 is an illustration of an example device showing various personas.

FIG. 3 is an illustration of an example device (e.g., cell phone) showing various personas. As depicted in FIG. 3, four personas are listed on the device 12: Work, Personal, Judy, and Bob. The list 18 can contain any number of personas. Personas can be given any appropriate label (e.g., name). The check mark 20 next to the Work persona indicates that the device is currently configured with the Work persona of the user. The user can trigger the device to configure to a selected persona/profile in any appropriate manner. In one example embodiment, the user can select a persona from the list of personas 18. Selection can be accomplished in any appropriate manner, such as, for example, highlighting a persona in the list 18, touching a persona in the list 18, moving a cursor over (hovering) a persona in the list 18, speaking the name of a persona in the list 18, or a combination thereof. In an example embodiment, after selecting a persona from the list 18, the user may be asked to enter a PIN or other appropriate indication of authorization. This can prevent unauthorized access to personas. Accordingly, upon selecting a persona that requires authorization, the device 12 can request authorization. The user, in response, can enter a password, PIN, a secret, or any appropriate indication of authorization. The authorization could be a biometric input such as a fingerprint (present to a fingerprint scanner or to a camera on the device 12), a retina image, a voice command, or the like. In an example configuration, the device 12 provides an indication of personas requiring authorization. For example, the device 12, as depicted in FIG. 3, is configurable to accommodate four personas. The persona labeled "Judy" and the persona labeled "Bob" have a lock icon 22 displayed nearby to indicate that authorization is needed to trigger the device 12 to configure.

In various example embodiments, the device 12 can be triggered to configure in ways other than by selecting a persona from the list 18. For example, the user can trigger the device by entering a short code, or the like, indicative of the selected persona/profile. The user can trigger the device by selecting a soft key on the device that is indicative of the selected persona/profile. The user can depress a button or the like (similar to a speed dial for a selected persona/profile) to trigger the device to configure to the selected persona/profile. The button, buttons, and/or soft keys, can be preconfigured to trigger the device to configure to a respective persona/profile. In yet another example embodiment, the user can trigger the device via a voice command only. For example, the user can say the name of the intended recipient (or any name) which will trigger the device to configure to the persona/profile of the name.

In another example embodiment, the device can be trigger to configure to a persona and associated profile via a biometric input only. For example, the user can place a fingertip on a fingerprint reader and the device can automatically configure with a persona/profile associated with the biometric input. In various embodiments, biometric input can be provided via a camera on the device to receive images of fingerprints, facial characteristics, retinas, or the like. Biometric input also can be provide acoustically, such as via voice recognition functionality.

Figure 4:
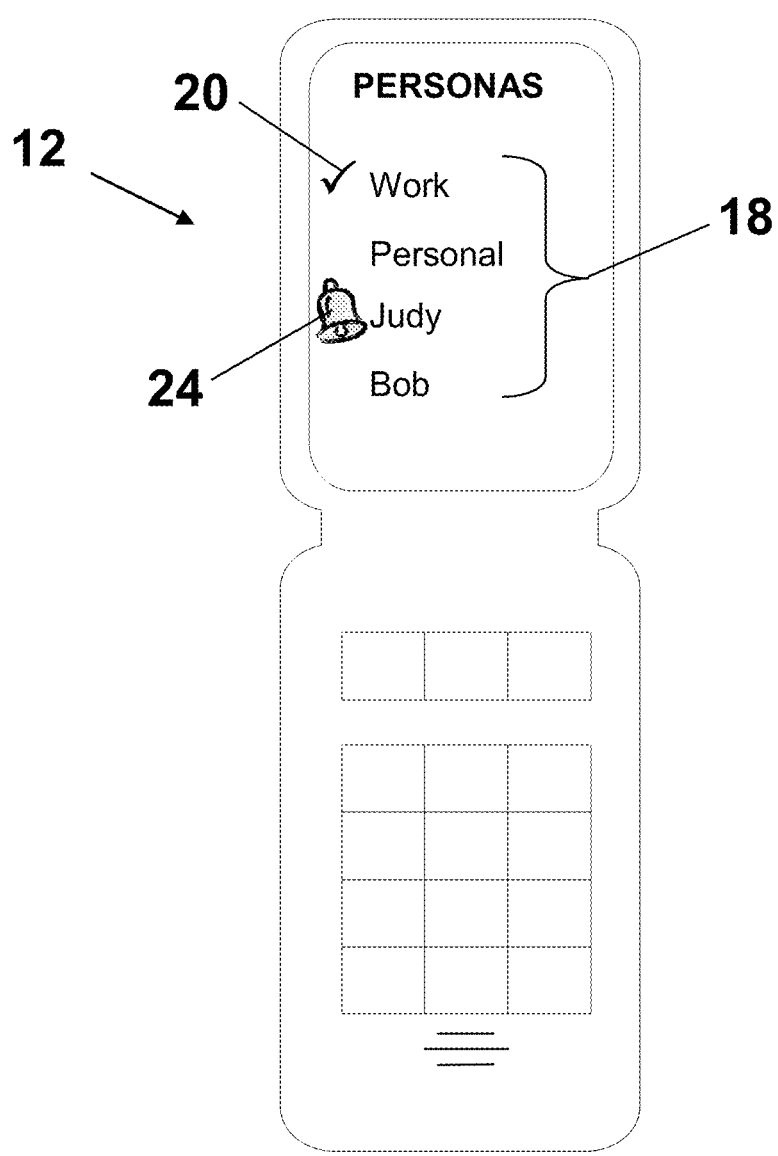
FIG. 4 illustrates an incoming call for an un-configured phone number.

Because the device 12 is configurable to accommodate a plurality of personas, each of which can have a different phone number, it is possible for a call to come to a phone number for which the device is not configured. In an example configuration, the device can provide an indication that the incoming call is for an un-configured phone number. This is depicted in FIG. 4. As shown in FIG. 4, the device 12 is currently configured with the Work persona as indicated by the check mark 20. When a call comes in for Judy, the list 18 of personas is displayed with an icon next to the Judy persona indication that a call has been made to the phone number corresponding the Judy persona. The user can then decide to trigger the phone to configure to the appropriate persona/profile (Judy, in this case) or not answer the call (e.g., allow the call to go to voice mail). Or, in another example embodiment, the device can automatically configure with the persona/profile of the called phone number.

Figure 5:
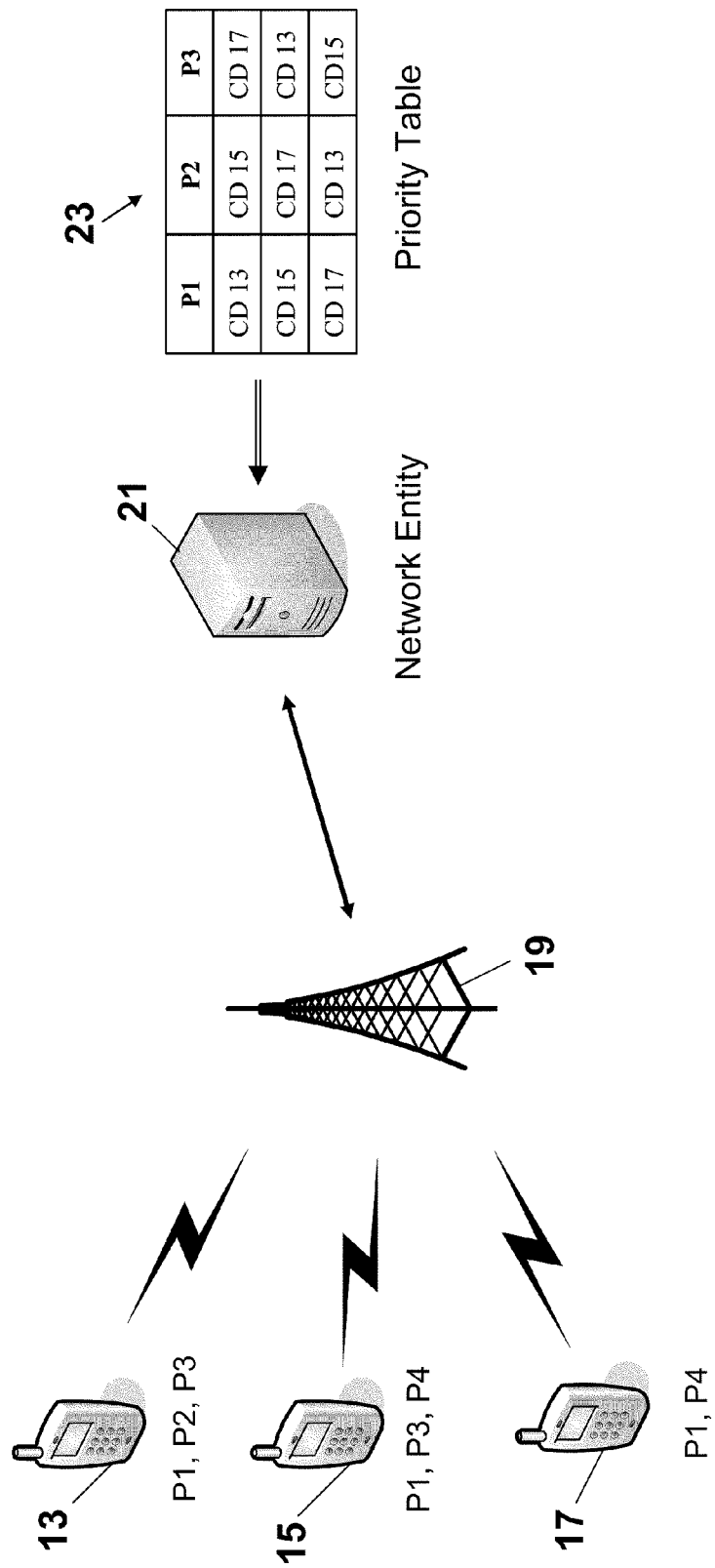
FIG. 5 an example wireless environment comprising communication devices configurable with multiple personas and profiles.

FIG. 5 depicts an example wireless environment comprising communication devices 13, 15, 17, a wireless communications network tower 19 and a network entity 21. The tower 19 and network entity 21 represent components of a wireless communications network. As depicted in the example scenario of FIG. 5, communications device 13 is configurable with three personas: P1, P2, and P3. Communications device 15 is configurable with three personas: P1, P3, and P4. And communications device 17 is configurable with two personas: P1 and P4. As described above, each persona has associated therewith a profile of functions. Each of P1, P2, P3, and P4 is associated with a different phone number. When a call is made to a phone number, the call can be handled in several ways. In one example embodiment, the call is sent to the communication device that most recently was configured with the phone number. In a second example embodiment, the call is sent to communication devices configurable with the phone number in a prioritized order. The priority and order are maintained by the network entity 21.

For example, if a call is made to the phone number associated with P1, any of communications devices 13, 15, or 17 could be eligible to receive the call. In accordance with the first example embodiment, if communications device 15 was the device that was most recently configured with persona P1, when the network entity 21, receives an indication of the call to the phone number associated with P1, the network entity 21 determines that communications device 15 was most recently configured with persona P1 (either via registration, calls made/received, or a combination thereof) and sends the call to communications device 15. In accordance with the second example embodiment, the priority order in which to send calls is stored in the network entity 21. As depicted in priority table 23, an example priority order to send a call for P1 is to communications device 13 first, to communications device 15 second, and to communications device 17 third. The priority order to send a call for P2 is to communications device 15 first, to communications device 15 second, and to communications device 13 third. And, the priority order to send a call for P3 is to communications device 17 first, to communications device 13 second, and to communications device 15 third. In this example embodiment a call can be sent to the first communications device in the priority table, if the call is not answered, the call is sent to the next communications device in the priority table, and so on. If the call is not answered after all communications devices in the table are tried, the call can be sent to voice mail, or handled in any appropriate manner. For example, if a call is sent to P2, the call is sent to communications device 15 first. If the call is not answered by communication device 15, the call is next sent to communications device 17. If the call is not answered by communication device 17, the call is next sent to communications device 13. If the call is not answered by communications device 13, the call is sent to voice mail.

In the foregoing example embodiments, the priority of the calls to multiple communications devices configurable with the same persona can be predetermined. That is, a user can reconfigure priority via a user profile. The priority can be determined in any appropriate manner. The priority can be determined in accordance with the type of persona. For example, a work persona could be at the top of the priority (receives calls first), a personal persona could be next in the priority, and so on. Priority could be determined in accordance with when a communications device was configured with a persona. For example, the communications device most recently configured with a persona would receive a call first for a phone number associated with that persona. The next most recently configured communications device configured with the persona would receive a call next for a phone number associated with that persona, and so on.

Figure 6:
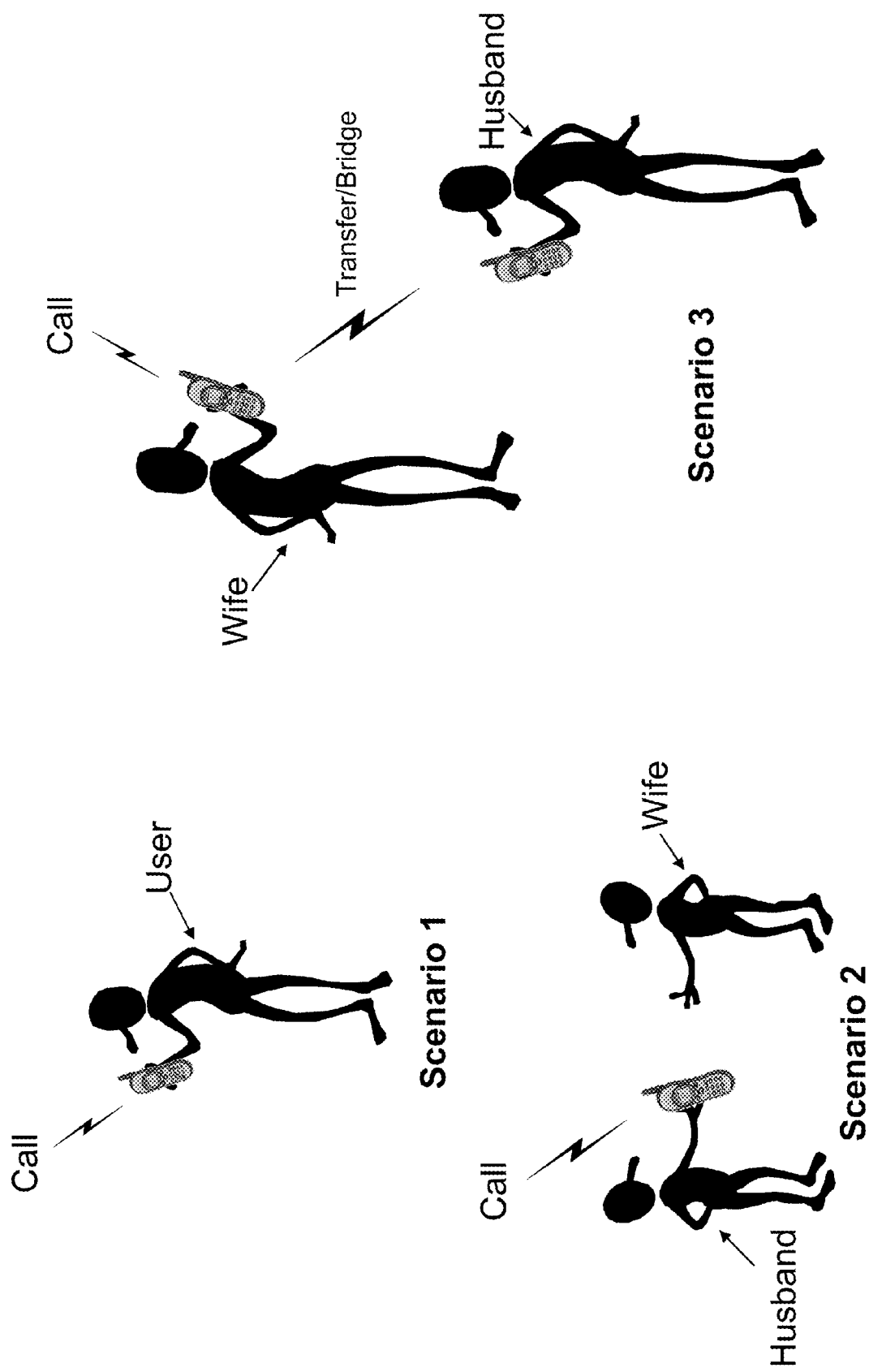
FIG. 6 depicts example scenarios utilizing a device configurable to accommodate multiple personas/profiles.

FIG. 6 depicts example scenarios utilizing a device configurable to accommodate multiple personas/profiles. In various embodiments, when receiving a call, the device can configure to the persona/profile of the intended recipient of the call, transfer the call to a device configured with the persona/profile of the intended recipient, answer the call and bridge in a device that is configured persona/profile of the intended recipient, or send instructions to another device to configure to the persona/profile of the intended recipient of the call and transfer and/or bridge the call.

When a call is received by the device, the intended recipient of the call is determined. The intended recipient can be determined by the user or by the device. The user can look at the caller ID or other indication of the caller (e.g., phone number) and determine the intended recipient. For example, the user can observe the name of the calling party and determine that the call is for him, for his son, for his wife, or from an unknown number. The user can then trigger the device to configure to the persona/profile of the intended recipient.

In an example embodiment, the device automatically determines the intended recipient of the call. The device can determine the intended recipient in any appropriate manner.

For example, the device can have stored therein, a list of individuals and the personas/profiles for each of the individuals in the list. The device also can have stored therein, for each individual in the list, a list of a calling parties for the respective individual (e.g., a friends list for each individual). When a call is received by the device, the device can determine the identity of the calling party (via the phone number, or the like, of the calling party) and match the identity of the calling party to an individual on the list stored in the device. The device can then configure with the persona/profile of the matching individual. The device also can provide an indication, on a display, the intended recipient of the call and that the device has been configured for that person. If the device determines that the call could be for more than one intended recipient, the device can provide a list of intended recipients, from which one can be selected. Selecting one would accordingly trigger the device to configure with the persona/profile of the selected person.

In example Scenario 1 in FIG. 6, a call is received by the device. An indication of the calling party appears on the device. The user looks at the display on the device and determines that the calling party is a work colleague. The user, knowing that his device is configured with his personal persona, triggers the device to configure to his work persona and associated profile. In this example scenario, the user presses a "Work" button, on the device, that has been preprogrammed to trigger configuration of the device with the his work persona/profile. Without further information from the user at that point, the device automatically configures to the user's work phone number, work service provider, and work billing account. Also in this example scenario, the device automatically allows the user access to his work calendar and scheduling software. Upon completion of the configuration process, the device provides an indication that it has configured to the user's work persona/profile. The user then answers the call. The calling party will see, on his caller ID, an indication of the user's work persona, such as the user's work phone number, or the like. At this point, all activities via the device will be provided and managed by the work service provider (e.g., charge for the call, minutes used, etc.). During the phone call, the user is informed that he will be attending a meeting next week. The user completes the call with his colleague and hangs up. Then, the user accesses his calendar and scheduling software to schedule the meeting for next week and to provide him a reminder a day before the meeting.

In example Scenario 2 of FIG. 6, another call is received by the device. An indication of the calling party appears on the device. The user (husband) looks at the display on the device and determines that the calling party is his wife's best friend. The husband, knowing that his device is configured with his work persona because he just finished talking to his work colleague, triggers the device to configure to his wife's persona and associated profile. In this example scenario, the husband brings up a display on the device and selects a "Wife" soft key on the device, that has been preprogrammed to trigger configuration of the device with the his wife's persona/profile. Without further information from the husband at that point, the device automatically configures to his wife's phone number, service provider, and billing account. Upon completion of the configuration process to his wife's persona/profile, the device provides an indication that it has configured to his wife's persona/profile. The husband then hands the device to his wife and says "it's for you." His wife answers the call. The calling party (wife's best friend) will see, on her caller ID, an indication of the wife's persona, such as the wife's phone number, or the like. At this point, all activities via the device will be provided and managed by the wife's service provider (e.g., charge for the call, minutes used, etc.).

In example Scenario 3 of FIG. 6, the user is on his way to the store. The wife, at home, receives a call on the device. An indication of the calling party appears on the device. The wife looks at the display on the device and determines that the calling party is her husband's best friend. The wife decides to transfer the call to her husband. The wife triggers the device to transfer the call. The call is transferred to the device that the husband has in his possession. When the call is transferred to the phone the husband has in his possession, an indication of the calling party appears on the device. The husband looks at the display on the device and determines that the calling party is his best friend. Knowing that his current device is configured with his wife's persona/profile, he triggers the device to configure to his personal persona and associated profile. In this example scenario, the user selects his personal persona/profile from a list of personas/profiles on the display of his device. Without further information from the husband at that point, the device automatically configures to the husband's personal phone number, service provider, and billing account. The husband then answers the call. The calling party will see, on his caller ID, an indication of the husband's personal persona, such as the husband's personal phone number, or the like. At this point, all activities via the device will be provided and managed by the husband's service provider (e.g., charge for the call, minutes used, etc.).

Figure 7:
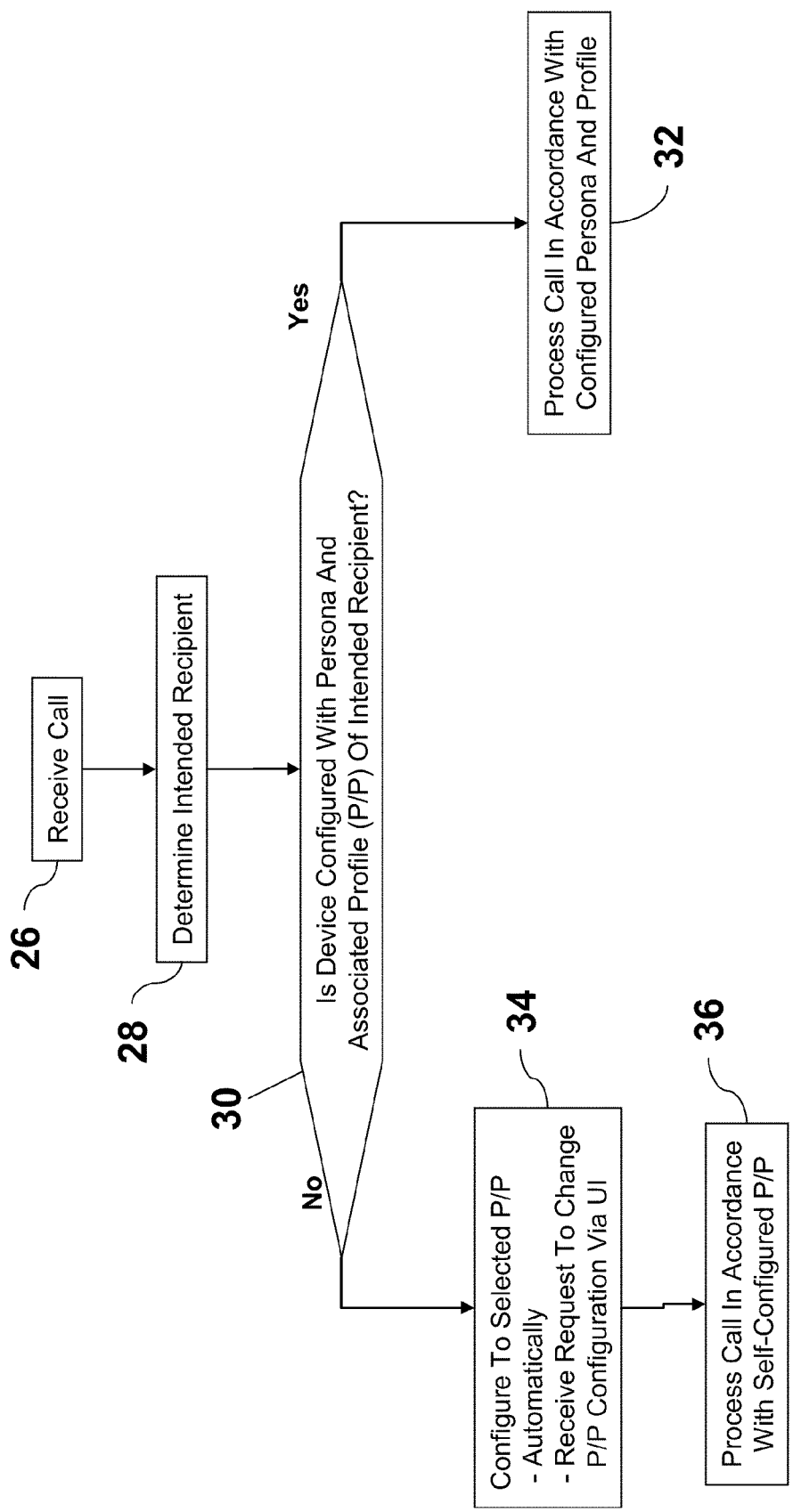
FIG. 7 is a flow diagram of an example process for handling a call via a device that is configurable to accommodate a plurality of personas and associated profiles.

FIG. 7 is a flow diagram of an example process for handling a call via a device that is configurable to accommodate a plurality of personas and associated profiles. A call is received by the device at step 26. At step 28, the intended recipient of the call is determined. As described above, the intended recipient can be determined automatically by the device or by a user of the device. The device automatically can determine the intended recipient via, for example, a list of intended recipients associated with a list of calling parties. For example, the device can have stored therein, a list of individuals representing potential calling parties and the personas/profiles for each of the individuals in the list. The device also can have stored therein, for each individual in the list, a list of calling parties for the respective individual (e.g., a friends list for each individual). Upon receiving a call, the device can determine the identity of the calling party (via the phone number, ID, or the like, of the calling party) and match the identity of the calling party to an individual on the list stored in the device. Lists can be updated by the user or an appropriate service.

The user of the device can determine the intended recipient in any appropriate manner. For example, the user can determine the identity of the calling party via a caller ID-like function on the device. The user can observe the name, number, avatar, moniker, ring tone, or the like, to determine the calling party. The user, upon determining the calling party, can determine the intended recipient of the call in any appropriate manner.

At step 30, it is determined if the device is configured with the persona and associated profile of the intended recipient of the call. This can be determined automatically and/or by the user. For example, the device can store an indication of its current configuration. This can be stored in memory on the device. When the intended recipient is determined (at step 28), the device can compare the determined configuration with the stored configuration to determine if the current configuration is that of the intended recipient. The user can determine if the device is configured with the persona and associated profile of the intended recipient by accessing the stored indication of the current configuration and comparing it to the determined intended recipient. In an example embodiment, the user obtains an indication of the current configuration via an appropriate UI operation.

If it is determined, at step 30, that the device is configured with the persona/profile of the intended recipient, the device, at step 32, handles the call in accordance with the configured persona/profile. If it is determined, at step 30, that the device is not configured with the persona/profile of the intended recipient, the device, at step 34 configures with the persona/profile of the intended recipient. The device can automatically be triggered to configure or the user can trigger the device to configure. The device can be triggered to configure in any appropriate manner, for example, as describe above. The device automatically can trigger configuration by comparing the current configuration with the persona/profile of the intended recipient. If they do not match, the device can automatically start configuration of the device with the persona/profile of the intended recipient.

The user can trigger configuration via the UI of the device. The configuration can be triggered via the simple UI operations, such as, for example, by entering a short code, pressing a button, selecting a persona from a list of personas (e.g., list of names of individuals), selecting a soft key on the device, providing a voice command to configure, or any combination thereof. At step 36, the device handles the call in accordance with the configured persona/profile.

Figure 8:
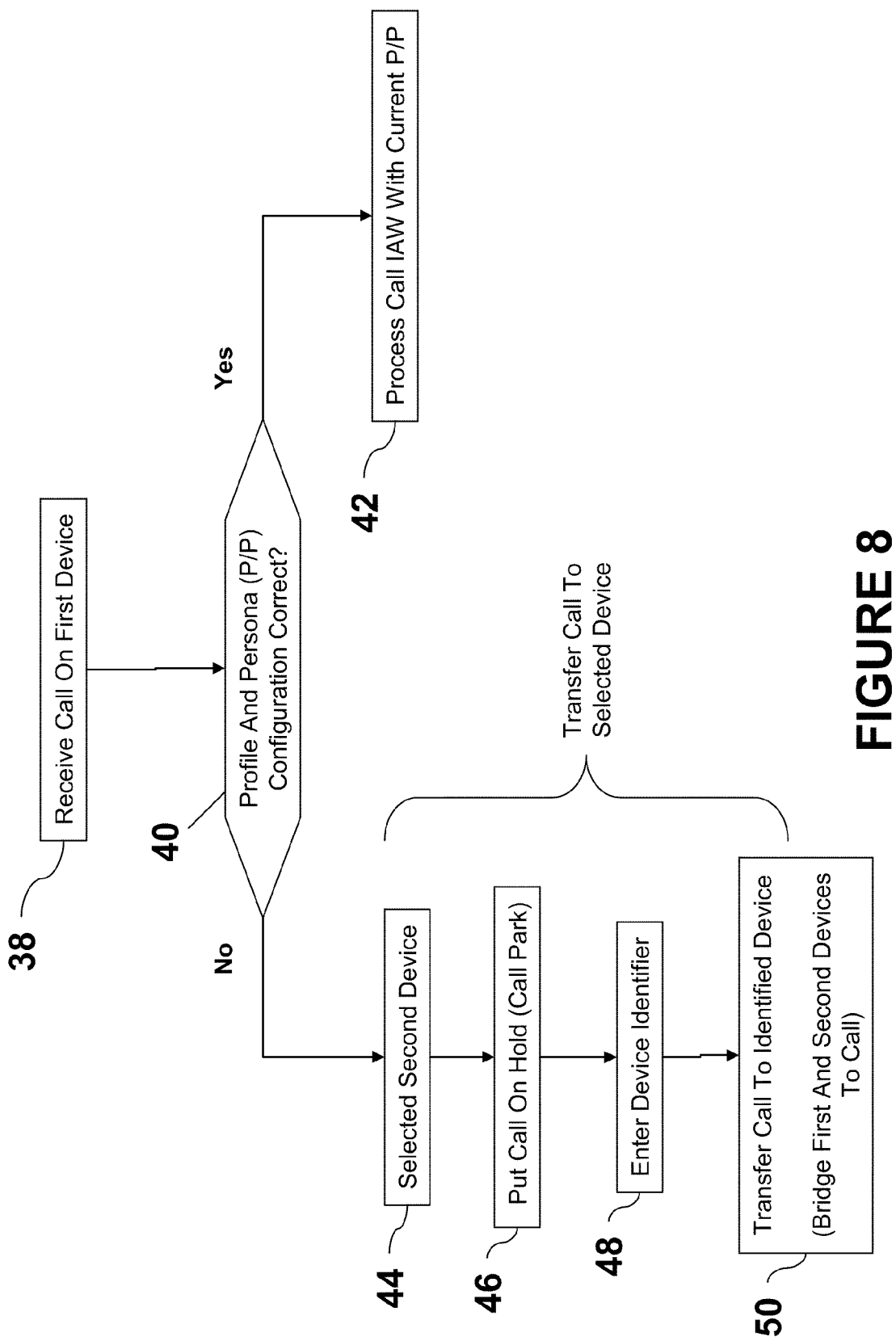
FIG. 8 is a flow diagram of an example process for transferring a call via a device that is configurable to accommodate a plurality of personas and associated profiles.

FIG. 8 is a flow diagram of an example process for transferring a call via a device that is configurable to accommodate a plurality of personas and associated profiles when the device is not configured with the persona/profile of the intended party of the call. A call is received by the device at step 38. At step 40, the intended recipient of the call is determined. The intended recipient can be determined automatically by the device or by a user of the device, in any appropriate manner, for example as described above. If it is determined, at step 40, that the device is configured with the persona/profile of the intended recipient, the device, at step 42, handles the call in accordance with the configured persona/profile.

If it is determined, at step 40, that the device (first device) is not configured with the persona/profile of the intended recipient, the device, the call is transferred to another device (second device). The second device is selected at step 44. The second device can be selected in any appropriate manner. For example, the second device can be selected by dialing the phone number of the other device. The second device can be selected by selecting an individual to which the call is to be transferred, and calling the individual's phone number. At step 46, the call is put on hold at the first device. The number of an identifier (e.g., phone number) of the second device is entered at the first device, at step 48. The connection is made with the second device and the call is transferred to the second device at step 50. In an example embodiment, instead of transferring the call at step 50, the first device and second devices can be bridged to the call.

Figure 9:
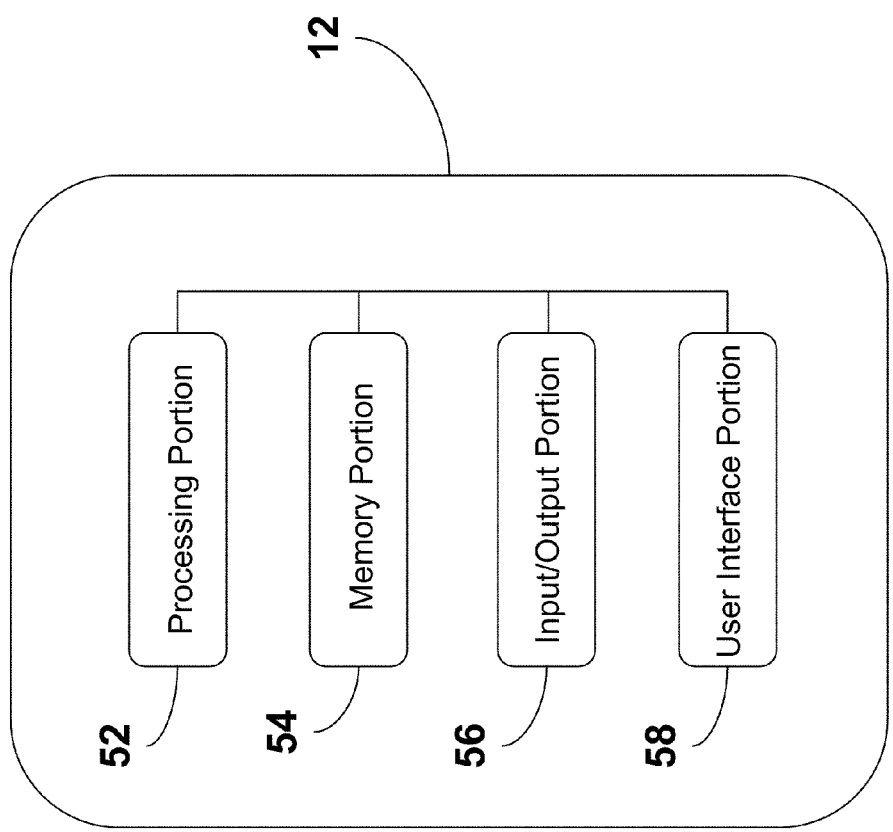
FIG. 9 is a block diagram of an example device configurable to accommodate a plurality of personas/profiles.

FIG. 9 is a block diagram of an example device 12. The example device 12 can include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a walkmans, etc.), a portable navigation device (e.g., GPS compatible device, A-GPS compatible device, etc.), or a combination thereof. The device 12 can include devices that are not typically thought of as portable, such as, for example, a public computing device, a navigation device installed in-vehicle, a set top box, or the like. The device 12 can include non-conventional computing devices, such as, for example, a kitchen appliance, a motor vehicle control (e.g., steering wheel), etc., or the like.

In an example configuration, the device 12 comprises a processing portion 52, a memory portion 54, an input/output portion 56, and a user interface (UI) portion 58. It is emphasized that the block diagram depiction of device 12 is exemplary and not intended to imply a specific implementation. For example, in an example configuration, the device 12 comprises a mobile phone and the processing portion 52 and/or the memory portion 54 are implemented, in part or in total, on a subscriber identity module (SIM) of the device 12, on a processor and memory of the device 12, other than a SIM, or a combination thereof.

The processing portion 52, memory portion 54, and input/output portion 56 are coupled together to allow communications therebetween. In various embodiments, the input/output portion 56 comprises a receiver of the device 12, a transmitter of the device 12, or a combination thereof. The input/output portion 56 is capable of receiving and/or providing information in order to allow the device 12 to accommodate a plurality of personas/profiles as described above. For example, the input/output portion 56 is capable of receiving/sending a call, and is capable of receiving/sending instructions to configure, as described above. In various configurations, the input/output portion 56 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In various configurations, the input/output portion 56 can receive and/or provide information wirelessly, via a wired connection, or a combination thereof. In an example configuration, the device 12 is a communications device, and the a selected persona is indicative of an identity portrayed by the device via the input/output portion.

The processing portion 52 is capable of performing functions in order to allow the device 12 to accommodate a plurality of personas/profiles as described above. For example, the processing portion 52 is capable of determining an intended recipient of a call, determining a persona/profile of an intended recipient, determining if the current configuration of the device is the same as, or different than, a persona/profile of an intended recipient, determining if the current configuration of the device is the same as, or different than, a selected persona/profile, comparing a current configuration with selected configuration, handling a call in accordance with a configured persona/profile, generating tables, files, or the like, indicative of personas/profiles for individuals, or any combination thereof.

The memory portion 54 can store any information utilized in conjunction with allowing the device 12 to accommodate a plurality of personas/profiles. For example, the memory portion 54 is capable of storing information related to a persona, information related to a profile, information indicative of relationships between personas and profiles, information indicative of potential intended recipients of a calling party, or any combination thereof. Depending upon the exact configuration and type of processor, the memory portion 54 can be volatile (such as dynamic RAM), non-volatile (such as ROM), or a combination thereof The device 12 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the device 12.

The device 12 also can contain a UI portion 58 allowing a user to communicate with the device 12. The UI portion 58 can provide the ability to control the device 12, via, for example, buttons, soft keys, voice actuated controls, a touch screen, movement of the device 12, visual cues (e.g., moving a hand in front of a camera on the device 12), or the like. The UI portion 58 can provide visual information (e.g., via a display), audio information (e.g., via speaker), mechanically (e.g., via a vibrating mechanism), or a combination thereof. In various configurations, the UI portion 58 can comprise a display, a touch screen, a keyboard, an accelerometer, a motion detector, a speaker, a microphone, a camera, a tilt sensor, or any combination thereof. The UI portion 58 can comprise means for inputting biometric information, such as, for example, fingerprint information, retinal information, voice information, and/or facial characteristic information.

In various embodiments, the device is a wireless device in communications with a wireless communications network. Various example network configurations are described below, showing how a device that is configurable to accommodate a plurality of personas/profiles can be utilized therewith.

The GSM is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), 4G Services such as Long Term Evolution (LTE), etc., as well as to other network services that become available in time. In this regard, the techniques of implementing a device configured to accommodate a plurality of personas/profiles can be applied independently of the method of data transport, and do not depend on any particular network architecture, or underlying protocols.

Figure 10:
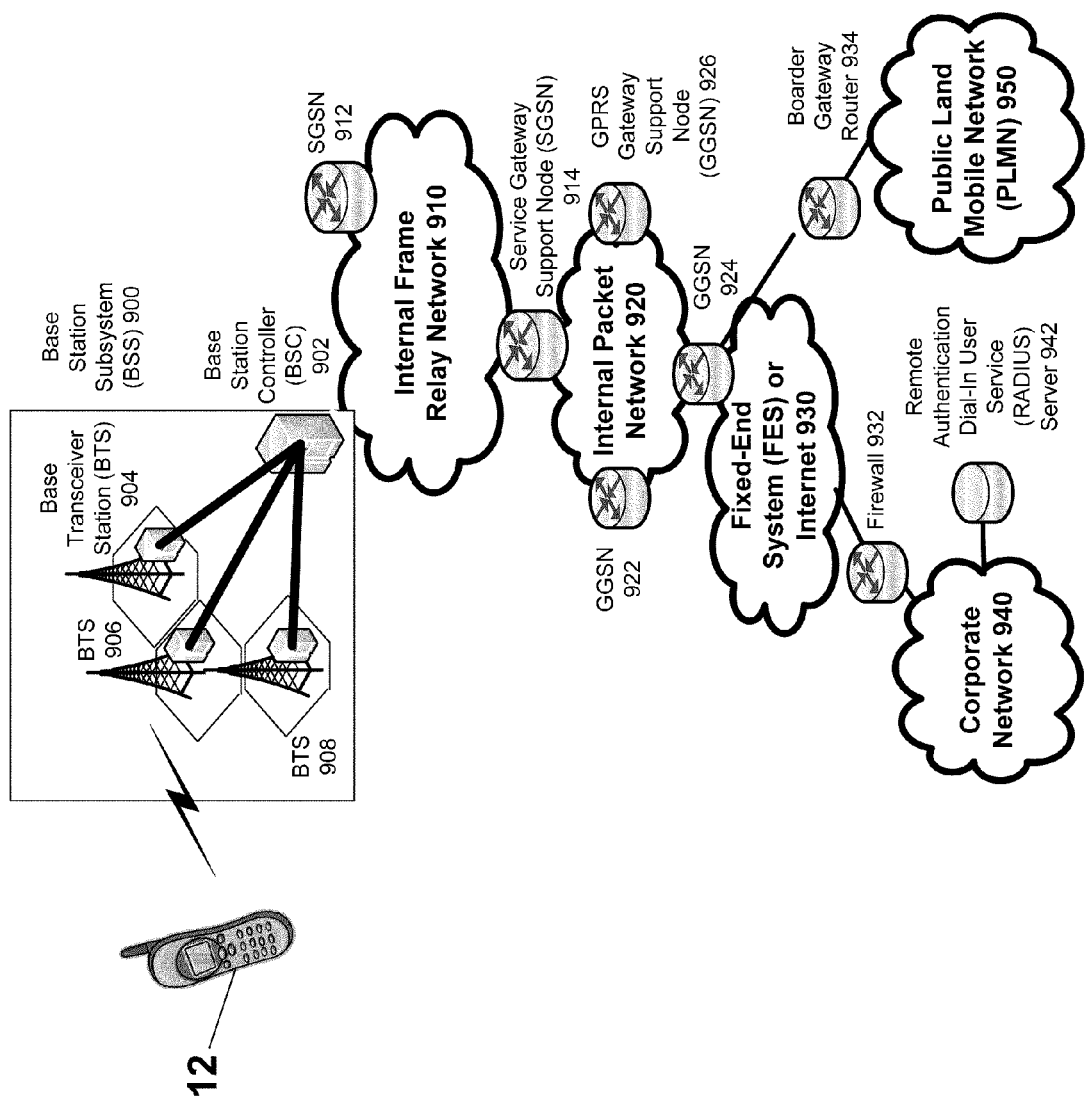
FIG. 10 depicts an overall block diagram of an exemplary packet-based mobile cellular network environment, such as a GPRS network, in which a device configured to accommodate a plurality of personas/profiles can be utilized.

FIG. 10 depicts an overall block diagram of an exemplary packet-based mobile cellular network environment, such as a GPRS network, in which device 12 configured to accommodate a plurality of personas/profiles can be utilized. In such an environment, there are a plurality of Base Station Subsystems ("BSS") 900 (only one is shown), each of which comprises a Base Station Controller ("BSC") 902 serving a plurality of Base Transceiver Stations ("BTS") such as BTSs 904, 906, and 908. As depicted in FIG. 10, the device 12 is in communications with BSS 900. BTSs 904, 906, 908, etc. are the access points where users of packet-based mobile devices become connected to the wireless network. In exemplary fashion, the packet traffic originating from user devices (e.g., device 12) is transported via an over-the-air interface to a BTS 908, and from the BTS 908 to the BSC 902. Base station subsystems, such as BSS 900, are a part of internal frame relay network 910 that can include Service GPRS Support Nodes ("SGSN") such as SGSN 912 and 914. Each SGSN is connected to an internal packet network 920 through which a SGSN 912, 914, etc. can route data packets to and from a plurality of gateway GPRS support nodes (GGSN) 922, 924, 926, etc. As illustrated, SGSN 914 and GGSNs 922, 924, and 926 are part of internal packet network 920. Gateway GPRS serving nodes 922, 924 and 926 mainly provide an interface to external Internet Protocol ("IP") networks such as Public Land Mobile Network ("PLMN") 950, corporate intranets 940, or Fixed-End System ("FES") or the public Internet 930. As illustrated, subscriber corporate network 940 may be connected to GGSN 924 via firewall 932; and PLMN 950 is connected to GGSN 924 via boarder gateway router 934. The Remote Authentication Dial-In User Service ("RADIUS") server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 11:
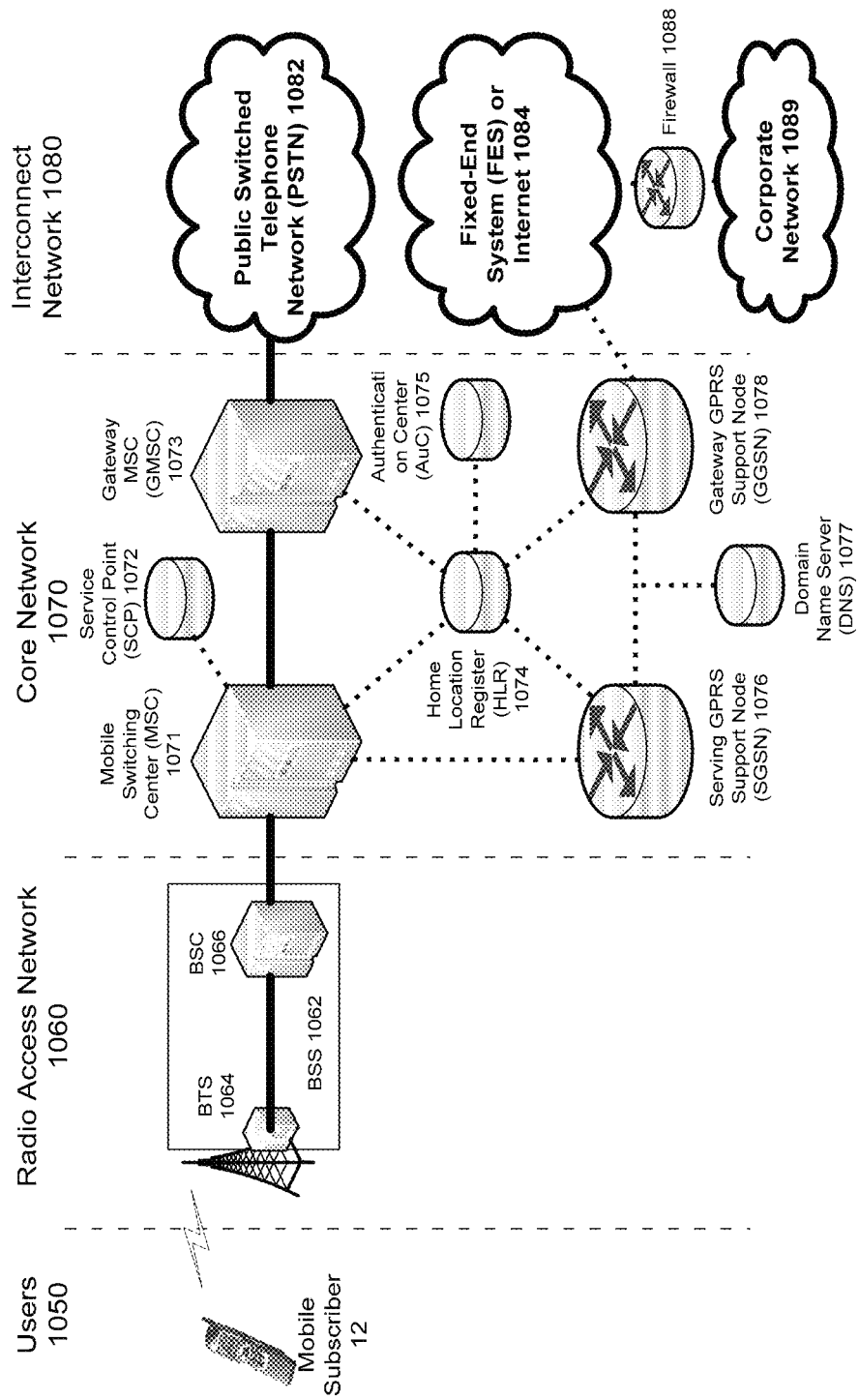
FIG. 11 illustrates an architecture of a typical GPRS network in which the a device configured to accommodate a plurality of personas/profiles can be utilized.

FIG. 11 illustrates an architecture of a typical GPRS network in which the device 12 configured to accommodate a plurality of personas/profiles can be utilized. The architecture depicted in FIG. 11 is segmented into four groups: users 1050, radio access network 1060, core network 1070, and interconnect network 1080. Users 1050 comprise a plurality of end users. Note, device 12 is referred to as a mobile subscriber in the description of network shown in FIG. 11. In an example embodiment, the device depicted as mobile subscriber 12 comprises a mobile device. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center ("MSC") 1071, Service Control Point ("SCP") 1072, gateway MSC 1073, SGSN 1076, Home Location Register ("HLR") 1074, Authentication Center ("AuC") 1075, Domain Name Server ("DNS") 1077, and GGSN 1078. Interconnect network 1080 also comprises a host of various networks and other network elements. As illustrated in FIG. 11, interconnect network 1080 comprises Public Switched Telephone Network ("PSTN") 1082, Fixed-End System ("FES") or Internet 1084, firewall 1088, and Corporate Network 1089.

A mobile switching center can be connected to a large number of base station controllers. At MSC 1071, for instance, depending on the type of traffic, the traffic may be separated in that voice may be sent to Public Switched Telephone Network ("PSTN") 1082 through Gateway MSC ("GMSC") 1073, and/or data may be sent to SGSN 1076, which then sends the data traffic to GGSN 1078 for further forwarding.

When MSC 1071 receives call traffic, for example, from BSC 1066, it sends a query to a database hosted by SCP 1072. The SCP 1072 processes the request and issues a response to MSC 1071 so that it may continue call processing as appropriate.

The HLR 1074 is a centralized database for users to register to the GPRS network. HLR 1074 stores static information about the subscribers such as the International Mobile Subscriber Identity ("IMSI"), subscribed services, and a key for authenticating the subscriber. HLR 1074 also stores dynamic subscriber information such as the current location of the mobile subscriber. Associated with HLR 1074 is AuC 1075. AuC 1075 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 11, when mobile subscriber 12 initiates the attach process by turning on the network capabilities of the mobile device, an attach request is sent by mobile subscriber 12 to SGSN 1076. The SGSN 1076 queries another SGSN, to which mobile subscriber 12 was attached before, for the identity of mobile subscriber 12. Upon receiving the identity of mobile subscriber 12 from the other SGSN, SGSN 1076 requests more information from mobile subscriber 12. This information is used to authenticate mobile subscriber 12 to SGSN 1076 by HLR 1074. Once verified, SGSN 1076 sends a location update to HLR 1074 indicating the change of location to a new SGSN, in this case SGSN 1076. HLR 1074 notifies the old SGSN, to which mobile subscriber 12 was attached before, to cancel the location process for mobile subscriber 12. HLR 1074 then notifies SGSN 1076 that the location update has been performed. At this time, SGSN 1076 sends an Attach Accept message to mobile subscriber 12, which in turn sends an Attach Complete message to SGSN 1076.

After attaching itself with the network, mobile subscriber 12 then goes through the authentication process. In the authentication process, SGSN 1076 sends the authentication information to HLR 1074, which sends information back to SGSN 1076 based on the user profile that was part of the user's initial setup. The SGSN 1076 then sends a request for authentication and ciphering to mobile subscriber 12. The mobile subscriber 12 uses an algorithm to send the user identification (ID) and password to SGSN 1076. The SGSN 1076 uses the same algorithm and compares the result. If a match occurs, SGSN 1076 authenticates mobile subscriber 12.

Next, the mobile subscriber 12 establishes a user session with the destination network, corporate network 1089, by going through a Packet Data Protocol ("PDP") activation process. Briefly, in the process, mobile subscriber 12 requests access to the Access Point Name ("APN"), for example, UPS.com, and SGSN 1076 receives the activation request from mobile subscriber 12. SGSN 1076 then initiates a Domain Name Service ("DNS") query to learn which GGSN node has access to the UPS.com APN. The DNS query is sent to the DNS server within the core network 1070, such as DNS 1077, which is provisioned to map to one or more GGSN nodes in the core network 1070. Based on the APN, the mapped GGSN 1078 can access the requested corporate network 1089. The SGSN 1076 then sends to GGSN 1078 a Create Packet Data Protocol ("PDP") Context Request message that contains necessary information. The GGSN 1078 sends a Create PDP Context Response message to SGSN 1076, which then sends an Activate PDP Context Accept message to mobile subscriber 12.

Once activated, data packets of the call made by mobile subscriber 12 can then go through radio access network 1060, core network 1070, and interconnect network 1080, in a particular fixed-end system or Internet 1084 and firewall 1088, to reach corporate network 1089.

Thus, network elements that can invoke the functionality of a device configured to accommodate a plurality of personas/profiles can include but are not limited to Gateway GPRS Support Node tables, Fixed End System router tables, firewall systems, VPN tunnels, and any number of other network elements as required by the particular digital network.

Figure 12:
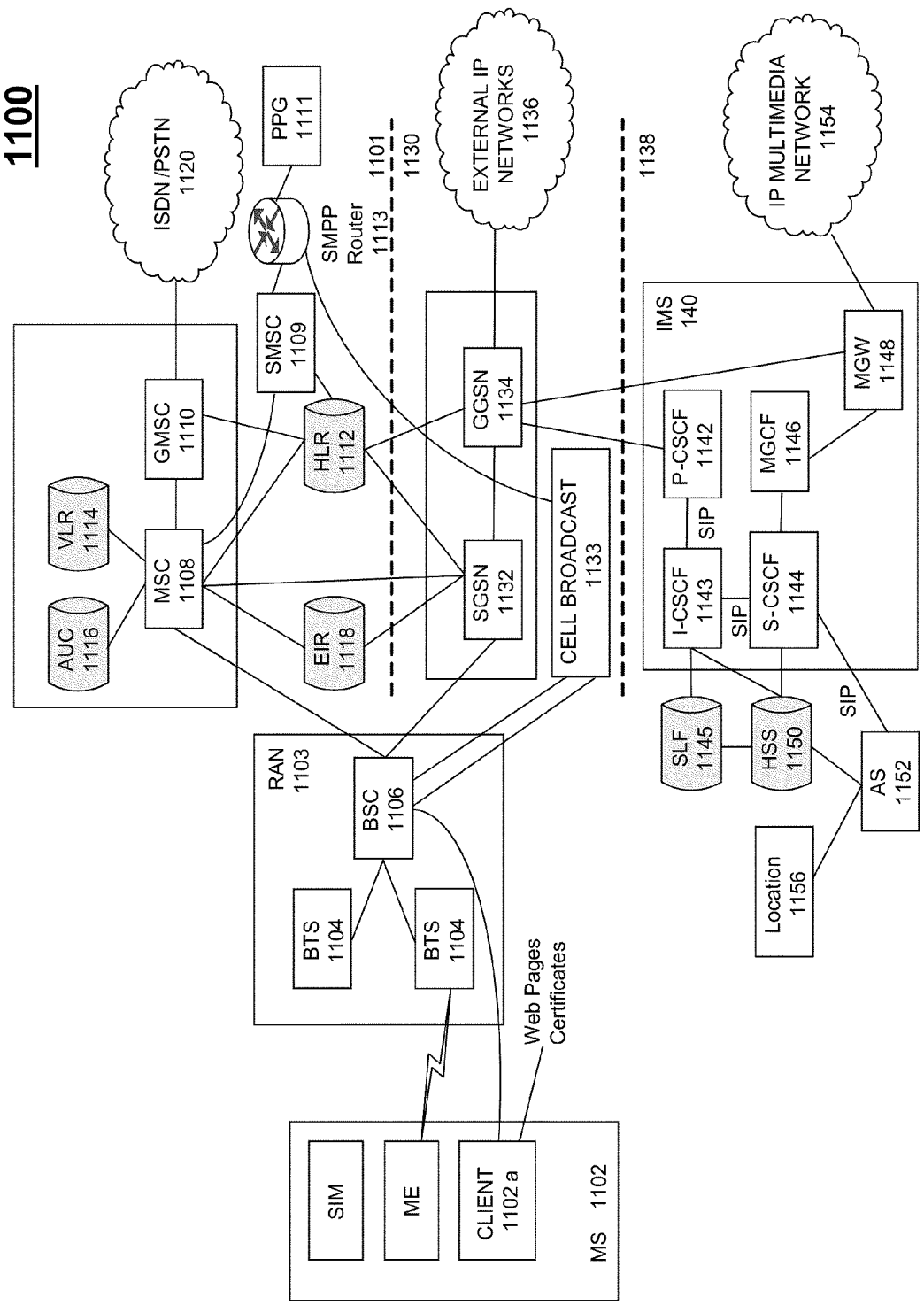
FIG. 12 illustrates an exemplary block diagram view of a GSM/GPRS/IP multimedia network architecture within which a device configured to accommodate a plurality of personas/profiles can be utilized.

FIG. 12 illustrates an exemplary block diagram view of a GSM/GPRS/IP multimedia network architecture 1100 within which a device configured to accommodate a plurality of personas/profiles can be utilized. As illustrated, architecture 1100 of FIG. 12 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile phone or a laptop computer (e.g., device 12) that is used by mobile subscribers, with a Subscriber identity Module (SIM). The SIM includes an International Mobile Subscriber Identity (IMSI), which is a unique identifier of a subscriber. The BTS 1104 is physical equipment, such as a radio tower, that enables a radio interface to communicate with the MS. Each BTS may serve more than one MS. The BSC 1106 manages radio resources, including the BTS. The BSC may be connected to several BTSs. The BSC and BTS components, in combination, are generally referred to as a base station (BSS) or radio access network (RAN) 1103.

The GSM core network 1101 also includes a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 performs a switching function for the network. The MSC also performs other functions, such as registration, authentication, location updating, handovers, and call routing. The GMSC 1110 provides a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that contains administrative information regarding each subscriber registered in a corresponding GSM network. The HLR 1112 also contains the current location of each MS. The VLR 1114 is a database that contains selected administrative information from the HLR 1112. The VLR contains information necessary for call control and provision of subscribed services for each MS currently located in a geographical area controlled by the VLR. The HLR 1112 and the VLR 1114, together with the MSC 1108, provide the call routing and roaming capabilities of GSM. The AuC 1116 provides the parameters needed for authentication and encryption functions. Such parameters allow verification of a subscriber's identity. The EIR 1118 stores security-sensitive information about the mobile equipment.

A Short Message Service Center (SMSC) 1109 allows one-to-one Short Message Service (SMS) messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1102 sends a location update including its current location information to the MSC/VLR, via the BTS 1104 and the BSC 1106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1130 is logically implemented on the GSM core network architecture by introducing two packet-switching network nodes, a serving GPRS support node (SGSN) 1132, a cell broadcast and a Gateway GPRS support node (GGSN) 1134. The SGSN 1132 is at the same hierarchical level as the MSC 1108 in the GSM network. The SGSN controls the connection between the GPRS network and the MS 1102. The SGSN also keeps track of individual MS's locations and security functions and access controls.

A Cell Broadcast Center (CBC) 1133 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1134 provides a gateway between the GPRS network and a public packet network (PDN) or other IP networks 1136. That is, the GGSN provides interworking functionality with external networks, and sets up a logical link to the MS through the SGSN. When packet-switched data leaves the GPRS network, it is transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 630 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 638 was introduced with 3GPP Release 5, and includes an IP multimedia subsystem (IMS) 640 to provide rich multimedia services to end users. A representative set of the network entities within the IMS 640 are a call/session control function (CSCF), a media gateway control function (MGCF) 646, a media gateway (MGW) 648, and a master subscriber database, called a home subscriber server (HSS) 650. The HSS 650 may be common to the GSM network 601, the GPRS network 630 as well as the IP multimedia network 638.

The IP multimedia system 640 is built around the call/session control function, of which there are three types: an interrogating CSCF (I-CSCF) 643, a proxy CSCF (P-CSCF) 642, and a serving CSCF (S-CSCF) 644. The P-CSCF 642 is the MS's first point of contact with the IMS 640. The P-CSCF 642 forwards session initiation protocol (SIP) messages received from the MS to an SIP server in a home network (and vice versa) of the MS. The P-CSCF 642 may also modify an outgoing request according to a set of rules defined by the network operator (for example, address analysis and potential modification).

The I-CSCF 643, forms an entrance to a home network and hides the inner topology of the home network from other networks and provides flexibility for selecting an S-CSCF. The I-CSCF 643 may contact a subscriber location function (SLF) 645 to determine which HSS 650 to use for the particular subscriber, if multiple HSS's 650 are present. The S-CSCF 644 performs the session control services for the MS 602. This includes routing originating sessions to external networks and routing terminating sessions to visited networks. The S-CSCF 644 also decides whether an application server (AS) 652 is required to receive information on an incoming SIP session request to ensure appropriate service handling. This decision is based on information received from the HSS 650 (or other sources, such as an application server 652). The AS 652 also communicates to a location server 656 (e.g., a Gateway Mobile Location Center (GMLC)) that provides a position (e.g., latitude/longitude coordinates) of the MS 602.

The HSS 650 contains a subscriber profile and keeps track of which core network node is currently handling the subscriber. It also supports subscriber authentication and authorization functions (AAA). In networks with more than one HSS 650, a subscriber location function provides information on the HSS 650 that contains the profile of a given subscriber.

The MGCF 646 provides interworking functionality between SIP session control signaling from the IMS 640 and ISUP/BICC call control signaling from the external GSTN networks (not shown). It also controls the media gateway (MGW) 648 that provides user-plane interworking functionality (e.g., converting between AMR- and PCM-coded voice). The MGW 648 also communicates with other IP multimedia networks 654.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 13:
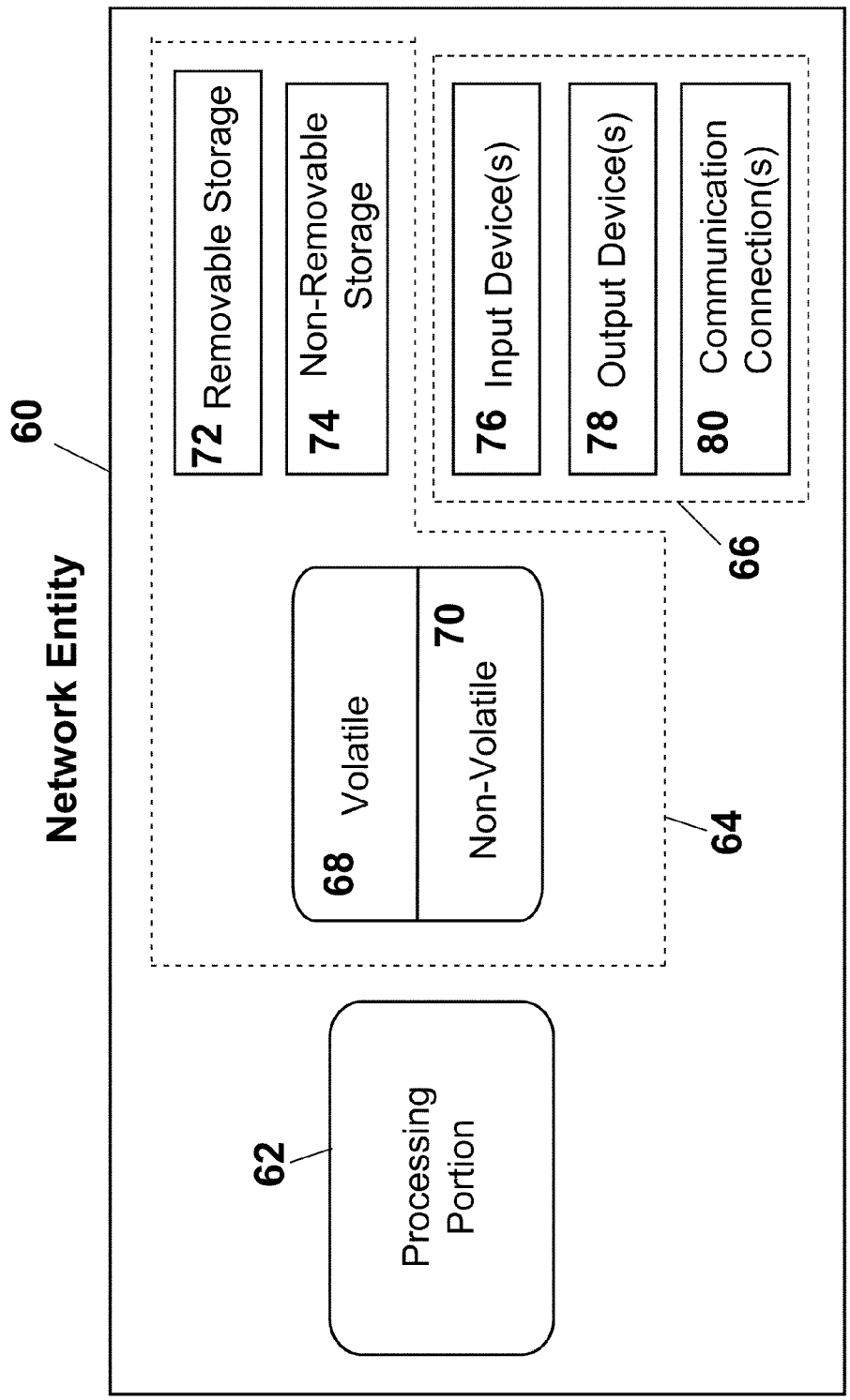
FIG. 13 is a block diagram of an example network entity 60 utilizable with a device configured to accommodate a plurality of personas/profiles.

As described above, a device configured to accommodate a plurality of personas/profiles can be utilized in a variety of networks. FIG. 13 is a block diagram of an example network entity 60 utilizable with a device configured to accommodate a plurality of personas/profiles. When used in conjunction with a network, the functionality needed to implement a device configured to accommodate a plurality of personas/profiles can reside in any one or combination of network entities. The network entity 60 depicted in FIG. 13 represents any appropriate network entity, or combination of network entities, such as a processor, a server, a gateway, etc., or any combination thereof. In an example configuration, the network entity 60 comprises a component or various components of a cellular broadcast system wireless network. It is emphasized that the block diagram depicted in FIG. 13 is exemplary and not intended to imply a specific implementation or configuration. Thus, the network entity 60 can be implemented in a single processor or multiple processors (e.g., single server or multiple servers, single gateway or multiple gateways, etc.). Multiple network entities can be distributed or centrally located. Multiple network entities can communicate wirelessly, via hard wire, or a combination thereof.

In an example configuration, the network entity 60 comprises a processing portion 62, a memory portion 64, and an input/output portion 66. The processing portion 62, memory portion 64, and input/output portion 66 are coupled together (coupling not shown in FIG. 13) to allow communications therebetween. The input/output portion 66 is capable of receiving and/or providing information from/to a device (e.g., device 12) configured to accommodate a plurality of personas/profiles. For example, the input/output portion 64 is capable of receiving/sending a call, and is capable of receiving/sending instructions from/to a device to configure, as described above. In various configurations, the input/output portion 64 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In various configurations, the input/output portion 64 can receive and/or provide information wirelessly, via a wired connection, or a combination thereof.

The processing portion 62 is capable of performing functions associated with a device configured to accommodate a plurality of personas/profiles. That is, the device can perform functions internally (by the device) and/or utilize the network entity 60 to perform functions. For example, the processing portion 62 is capable of determining an intended recipient of a call, determining a persona/profile of an intended recipient, determining if the current configuration of the device is the same as, or different than, a persona/profile of an intended recipient, determining if the current configuration of the device is the same as, or different than, a selected persona/profile, comparing a current configuration with selected configuration, handling a call in accordance with a configured persona/profile, generating tables, files, or the like, indicative of personas/profiles for individuals, or any combination thereof.

The memory portion 64 can store any information utilized in conjunction with a device configured to accommodate a plurality of personas/profiles. Thus, the device can utilize its internal memory/storage capabilities and/or utilize memory/storage capabilities of the network entity 60. For example, the memory portion 64 is capable of storing information related to a persona, information related to a profile, information indicative of relationships between personas and profiles, information indicative of potential intended recipients of a calling party, or any combination thereof. Depending upon the exact configuration and type of network entity, the memory portion 64 can include computer readable storage media that is volatile 68 (such as dynamic RAM), non-volatile 70 (such as ROM), or a combination thereof. The network entity 60 can include additional storage, in the form of computer readable storage media (e.g., removable storage 72 and/or non-removable storage 74) including, but not limited to, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the network entity 60.

The network entity 60 also can contain communications connection(s) 80 that allow the network entity 60 to communicate with other devices, network entities, or the like. A communications connection(s) can comprise communication media. Communication media typically embody computer readable instructions, data structures, program modules or other data in a modulated data signal such as a carrier wave or other transport mechanism and includes any information delivery media. By way of example, and not limitation, communication media include wired media such as a wired network or direct-wired connection, and wireless media such as acoustic, RF, infrared, and other wireless media. The term computer readable media as used herein includes both storage media and communication media. The network entity 60 also can include input device(s) 76 such as keyboard, mouse, pen, voice input device, touch input device, etc. Output device(s) 78 such as a display, speakers, printer, etc. also can be included.

The foregoing description sets forth some exemplary telephony radio networks and non-limiting operating environments in which a device configured to accommodate a plurality of personas/profiles can be utilized. The foregoing-described operating environments should be considered non-exhaustive, however, and thus the foregoing-described network architectures merely show how a device configured to accommodate a plurality of personas/profiles can be incorporated into existing network structures and architectures. It can be appreciated, however, that a device configured to accommodate a plurality of personas/profiles can be incorporated into existing and/or future alternative architectures for communication networks as well.

While example embodiments of a device configured to accommodate a plurality of personas/profiles have been described in connection with various computing devices/processor, the underlying concepts can be applied to any computing device, processor, or system capable of accommodating a plurality of personas/profiles. The various techniques described herein can be implemented in connection with hardware or software or, where appropriate, with a combination of both. Thus, the methods and apparatuses for a device configured to accommodate a plurality of personas/profiles, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for accommodating a plurality of personas/profiles. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods associated with a device configured to accommodate a plurality of personas/profiles also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus accommodating a plurality of personas/profiles. When implemented on a general-purpose processor, the program code combines with the processor to provide a unique apparatus that operates to invoke the functionality of accommodating a plurality of personas/profiles. Additionally, any storage techniques used in connection with a device configured to accommodate a plurality of personas/profiles can invariably be a combination of hardware and software.

While a device configured to accommodate a plurality of personas/profiles has been described in connection with the various embodiments of the various figures, it is to be understood that other similar embodiments can be used or modifications and additions can be made to the described embodiment for performing the same function of a device configured to accommodate a plurality of personas/profiles without deviating therefrom. For example, one skilled in the art will recognize that a device configured to accommodate a plurality of personas/profiles as described herein may apply to any environment, whether wired or wireless, and may be applied to any number of such devices connected via a communications network and interacting across the network. Therefore, a device configured to accommodate a plurality of personas/profiles should not be limited to any single embodiment, but rather should be construed in breadth and scope in accordance with the appended claims.

What is claimed:

1. A communications device comprising:
   memory having executable instructions stored thereon; and:
   a processor coupled to the memory, the processor configured to execute the executable instructions to effectuate operations comprising:
   receiving an indication of a selected persona from a plurality of personas, wherein receipt of the indication of the selected persona is indicative of the communications device having most recently been configured, as compared to a plurality of communications devices, with the selected persona;
   receiving an indication of a selected profile of functions associated with the selected persona, the selected profile selected from a plurality of functions; and receiving an indication of a trigger;
configuring the communications device to provide characteristics of the selected persona; and
configuring the communications device to provide functionality of the selected profile.

2. The communications device in accordance with claim 1, wherein:
the selected persona is indicative of an identity portrayed by the communications device.

3. The communications device in accordance with claim 1, wherein:
a selected persona and associated profile are autonomous with respect to any other selected persona and profile from the plurality of personas and functions.

4. The communications device in accordance with claim 1, wherein:
the communications device is triggered to configure to provide characteristics of the selected persona and provide functionality of the selected profile via at least one of:
depressing a button on the communications device;
selecting a soft key on the communications device; or
providing a voice command to the communications device.

5. The communications device in accordance with claim 1, wherein the communications device is a mobile device.

6. The communications device in accordance with claim 5, wherein the mobile device is triggered to configure to provide characteristics of the selected persona and provide functionality of the selected profile via entering a short code on the mobile device.

7. The communications device in accordance with claim 1, wherein the selected persona comprises a characteristic indicative of an identity of a user of the communications device.

8. The communications device in accordance with claim 7, wherein a caller ID receiving a call from the communications device indicates the identity of the user.

9. The communications device in accordance with claim 1, wherein the selected persona comprises a characteristic indicative of a telephone number associated with a user of the device.

10. The communications device in accordance with claim 1, wherein the selected persona comprises a characteristic indicative of one of:
a work persona of a user of the communications device, or
a personal persona of the user of the communications device.

11. The communications device in accordance with claim 1, wherein the selected persona is indicative of a service provider for the communications device.

12. The communications device in accordance with claim 1, wherein each persona of the plurality of personas is indicative of a common service provider.

13. The communications device in accordance with claim 1, wherein:
characteristics of the selected persona are stored on the communications device; and
functions of the selected profile are stored on the communications device.

14. The communications device in accordance with claim 1, wherein:
the communications device obtains characteristics of the selected persona via a network; and
the communications device obtains functions of the selected profile via a network.

15. The communications device in accordance with claim 1, wherein:
a call to a phone number associated with a first persona of the plurality of personas is provided to the communications device among a plurality of communications devices configurable with the persona in a first priority order based on the first persona; and;
a call to a phone number associated with a second persona is provided to the communications device among a plurality of communications devices configurable with the persona in a second priority order based on the second persona.

16. The communications device in accordance with claim 1, wherein the operations further comprise:
configuring the communications device with a predetermined persona and associated profile in accordance with a location of the communications device.

17. A method comprising:
receiving a call on a communications device;
determining, via the communications device, an intended recipient of the call;
determining, via the communications device, a persona of the intended recipient,
wherein;
the persona has an associated phone number; and
receipt of the call is indicative of the communications device having most recently been configured, as compared to a plurality of communications devices, with the phone number;
determining, via the communications device, a profile of functions associated with the persona of the intended recipient;
configuring, via the communications device, the communications device to provide characteristics of the persona of the intended recipient; and
configuring, via the communications device, the communications device to provide functionality of the determined profile.

18. A method comprising:
receiving a call on a first mobile device;
determining, via the first mobile device, an intended recipient of the call;
determining that the first mobile device is not configured with a persona of the intended recipient;
determining, via the first mobile device, that a second mobile device is configured with the persona of the intended recipient and was most recently configured, as compared to a plurality of communications devices, with the persona of the intended recipient; and
performing, via the first mobile device, one of:
transferring the call to the second mobile device; or
answering the call on the first mobile device and bridging the second mobile device into the call.

19. The method in accordance with claim 18, wherein transferring the call to the second mobile device is accomplished via at least one of:
depressing a button on the first mobile device;
selecting a soft key on the first mobile device;
providing a voice command to the first mobile device;
depressing a button on the second mobile device;
selecting a soft key on the second mobile device; or
providing a voice command to the second mobile device.

20. The method in accordance with claim 18, wherein bridging the call to the second mobile device is accomplished via at least one of:
depressing a button on the first mobile device;
selecting a soft key on the first mobile device;

providing a voice command to the first mobile device;
depressing a button on the second mobile device;
selecting a soft key on the second mobile device; or
providing a voice command to the second mobile device.

21. A network entity comprising:
memory having executable instructions stored thereon; and a processor coupled to the memory, the processor configured to execute the executable instructions to effectuate operations comprising:
communicating with communications devices configurable with a plurality of personas and associated profiles;
receiving an indication to provide a call to a first phone number associated with a first persona of the plurality of personas;
determining at least one communications device that is configurable with the first persona and was most recently configured, as compared to a plurality of communications devices, with the first persona; and
determining a priority order in which to provide the call to the at least one communications device based on a type of the first persona; and
providing the call to the at least one communications device configurable with the first persona in the determined priority order.

22. The network entity in accordance with claim 21, wherein the call is provided first to a communications device that has most recently been configured with the first persona.

23. The network entity in accordance with claim 21, wherein the priority order is determined in accordance with a time when each of the at least one communications device was configured with the first persona.

24. The network entity in accordance with claim 21, wherein a communications device of the at least one communications device that was most recently configured with the first persona is the only communications device to which the call is provided.

* * * * *